United States Patent [19]

Grattapaglia

[11] 4,283,964

[45] Aug. 18, 1981

[54] CONTROL SYSTEM FOR POWER SHIFT TRANSMISSION

[75] Inventor: Giorgio Grattapaglia, Turin, Italy

[73] Assignee: Fiat-Allis Macchine Movimento Terra S.p.A., Lecce, Italy

[21] Appl. No.: 59,957

[22] Filed: Jul. 23, 1979

[30] Foreign Application Priority Data

Oct. 9, 1978 [IT] Italy ............................. 69330 A/78

[51] Int. Cl.³ ............................................. G05G 9/04
[52] U.S. Cl. ............................ 74/471 XY; 137/636.2
[58] Field of Search .......... 74/471 R, 471 XY, 473 R; 137/636, 636.2

[56] References Cited

U.S. PATENT DOCUMENTS

| | | | |
|---|---|---|---|
| 1,552,135 | 9/1925 | Frink | 74/471 XY |
| 2,551,442 | 5/1951 | Kuhlman | 137/636 |
| 2,976,742 | 3/1961 | Miscovich | 137/636.2 X |
| 3,625,082 | 12/1971 | Muller et al. | 74/471 XY |
| 4,019,401 | 4/1977 | Drone | 74/471 XY |
| 4,169,443 | 10/1979 | Todeschini | 74/471 XY |

Primary Examiner—Allan D. Herrmann
Attorney, Agent, or Firm—August E. Roehrig, Jr.; Robert A. Brown

[57] ABSTRACT

A control lever mechanism for controlling the operative position of a plurality of control valves of a hydraulic distributor by coupling movement of a control lever into selected motion of a pair of rotatable output shafts controlling operation of the valves. Movement of the control lever in planes extending in a longitudinal, transverse, or combination of these directions, is transmitted to the output shaft through interconnecting linkages employing a plurality of spherical joints. The control lever mechanism also includes provisions to protect the linkages from being adversely affected by the introduction of foreign substances such as dirt and other elements.

12 Claims, 5 Drawing Figures

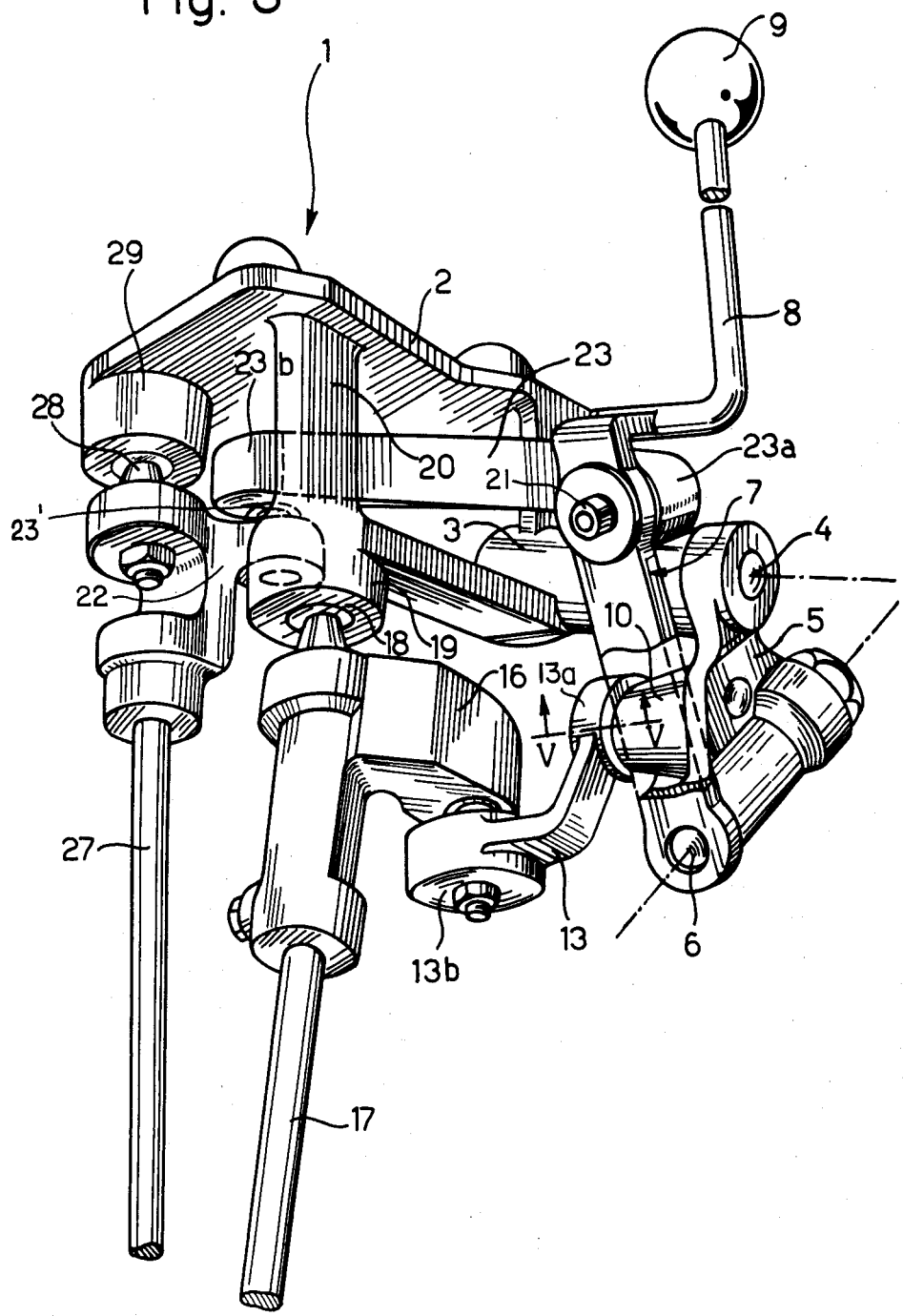

CONTROL SYSTEM FOR POWER SHIFT TRANSMISSION

BACKGROUND OF THE INVENTION

This invention relates in general to control mechanisms and, in particular, to a control lever mechanism for controlling the operative position of the control valves of a hydraulic distributor.

More specifically, but without restriction to the particular use shown and described, this invention relates to a control lever mechanism to control the valves of a hydraulic distributor employed for the purpose of operating the gears of a transmission of a vehicle.

In the operation of a vehicle, such as, for example, an earth moving machine, the operator of the vehicle controls its operation through manipulation of a control lever which movement is coupled to valves of a hydraulic device to control the operation of the gears as required. Control of the valves of the hydraulic device is generally achieved through movement of a pivoted control lever in a multitude of directions relative to the vehicle. To facilitate operation of the machine, it is desirable that such control be effected by the use of a single lever. Control lever mechanisms employed in the prior art are deficient in providing a rigid, yet lightweight single lever linkage between the vehicle operator and the valves of the distributor because of the utilization of linkages and couplings subject to high friction losses. Because of this inefficient coupling of the movement of the control lever to control the valves, known devices subject the vehicle operator to burdensome physical effort during operation of the vehicle.

It is therefore an object of the invention to improve the control of valves of a hydraulic device;

A further object of this invention is to transmit movement from a pivoted control lever mechanism to two or more valves of a hydraulic device;

Another object of this invention is to reduce the friction generated in the couplings of the linkages of a control lever mechanism;

A still further object of this invention is to maximize the ease and effectiveness by which hydraulic valves of a hydraulic device are controlled.

These and other objects are attained in accordance with the present invention wherein there is provided a control lever mechanism for controlling the operative position of a plurality of control valves of a hydraulic distributor by coupling movement of a control lever into selected motion of a pair of rotatable output shafts controlling operation of the valves. Movement of the control lever in planes extending in a longitudinal, transverse, or combination of these directions, is transmitted to the output shaft through interconnecting linkages employing a plurality of spherical joints. The control lever mechanism also includes provisions to protect the linkages from being adversely affected by the introduction of foreign substances such as dirt and other elements.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 3 is a view of the control lever mechanism of the invention, on an enlarged scale, in the direction of the arrow III of FIG. 2;

DESCRIPTION OF A PREFERRED EMBODIMENT

Figure 1:
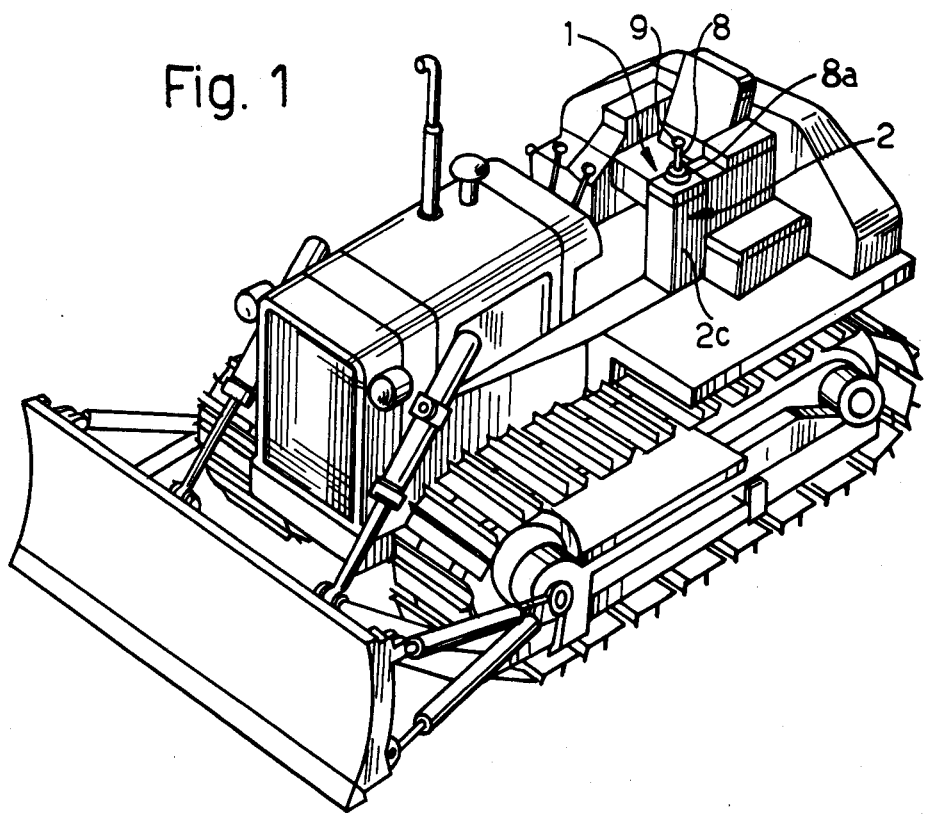
FIG. 1 is a perspective view of an earth moving vehicle provided with a control lever mechanism according to the invention.

For purposes of illustration without the intention of being so limited, the control lever mechanism of the invention is described with reference to use in an earth moving vehicle of the type shown in FIG. 1. The control lever mechanism herein described is designated generally by the reference numeral 1. The mechanism of the invention is adapted to be positioned adjacent to the operator of an earth moving vehicle for the purpose of controlling the operative position of the control members, normally at least two valves, of a hydraulic distributor which is conventionally utilized to effect shifting of and otherwise control the gears of the transmission of the vehicle.

Control lever mechanism 1 includes a housing 2 having an upper wall 2a, a bottom wall 2b, and a plurality of sidewalls 2c, which enclose the mechanism positioned therein. Top wall 2a supports, by suitable bracketing, a shaft member 3 extending substantially laterally of the housing 2 in parallel relationship to upper wall 2a. Hollow shaft 3 includes a pivot shaft 4 which supports an intermediate lever 5 for pivotal movement at one end thereof. The opposite end of lever 5 is provided with a hollow shaft receiving cylinder to support a rotary shaft 6 for pivotal movement. One end of a control lever 7 is coupled to shaft 6 for pivotal movement in a plane perpendicular to the movement of lever 5 about pivot shaft 4, wherein the direction of movement about shaft 6 is substantially normal to the longitudinal axis of the machine. Control lever 7 includes a lever arm 8 of a cylindrical cross section at its opposite end which extends upward through an opening in upper wall 2a, and is provided at its upper end with a knob 9 by which the vehicle operator can manipulate control lever 7 as needed during operation of the machine. A bellows-shaped boot 8a, preferably fabricated from a flexible sealing material, surrounds the lever arm 8 adjacent the opening in wall 2a to prevent foreign substances, such as dirt, dust, and the like, from being introduced into the housing 2.

Figure 5:
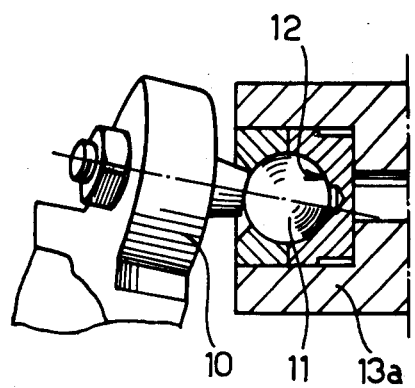
FIG. 5 is a partial sectional view, on an enlarged scale, taken on line V—V of FIG. 3.

Intermediate lever 5 is further provided with a cylindrical projection 10 on which a spherical ball 11 is affixed as shown in FIG. 5. The spherical ball 11 of projection 10 interconnects with a spherical socket 12 formed in an intermediate connecting rod 13 at an end 13a by which a swivel joint is created between lever 5 and intermediate rod 13. As best shown in FIG. 3, the opposite end 13b of intermediate rod 13 carries a spherical ball to interconnect with a spherical socket formed in a radial arm 16, forming a swivel joint similar in structure and function to the swivel joint described in connection with cylindrical projection 10 and end 13a as shown in FIG. 5.

The opposite end of radial arm 16 includes a perpendicular oriented portion having an end opening to support a vertical shaft 17 rigidly affixed therein by any suitable technique, such as, for example, by screws. The upper portion of radial arm 16 includes a spherical ball 18 in alignment with the axis of the shaft 17, which is inserted into a spherical socket formed in the bottom surface of a boss 19 mounted in the lower end of a vertically extending support member 20 carried by wall 2a. The coupling of spherical ball 18 with the socket formed in boss 19 creates a spherical swivel socket of the type previously described and shown in FIG. 5.

A pivot pin 21 laterally extends through an upper portion of a control lever 7 to mount a second intermediate connection rod 23 at an end 23a. The end of pivot pin 21 and end 23a are coupled by means of a spherical ball joint also of the type previously described with reference to FIG. 5 to pivotally support connecting rod 23 by a swivel coupling. The opposite end 23b of the second intermediate connecting rod 23 likewise is coupled by means of a spherical ball joint 23', as previously described, to a radial arm 22. Radial arm 22 includes a substantially vertically extending lower portion having an opening at an end to which a rotary shaft 27 is rigidly attached. The upper portion of radial arm 22 includes a spherical ball 28 having a center in alignment with the axis of shaft 27 forming still another spherical swivel joint with a spherical socket formed in boss 29 affixed to the underside of wall 2a.

From the foregoing description, it should be apparent that the spherical ball joints, by which vertical rotatable shafts 17 and 27 are supported through radial arms 16 and 22, respectively, are oriented with the openings of the spherical sockets of bosses 19 and 29 being disposed downward. Such an orientation of the spherical sockets inhibits the collection of foreign substances such as dirt and dust between the coupled surfaces of the socket and its respective spherical ball. Similarly, for the same purpose, the spherical joints coupling radial arms 16 and 22 to ends 13b and 23b of the first and second intermediate connecting rods 13 and 23, are likewise directed with their spherical sockets opening downward toward the support surface upon which the vehicle is positioned.

Figure 4:
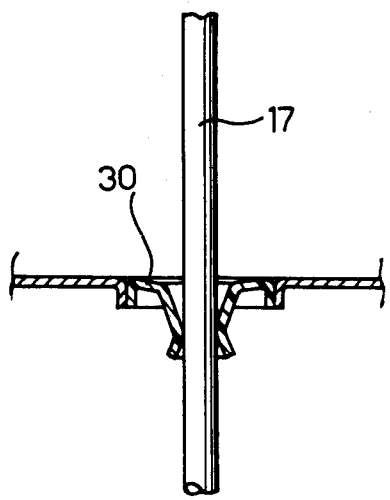
FIG. 4 is a cross sectional view, in an enlarged scale, of a detail of FIG. 2.
Figure 2:
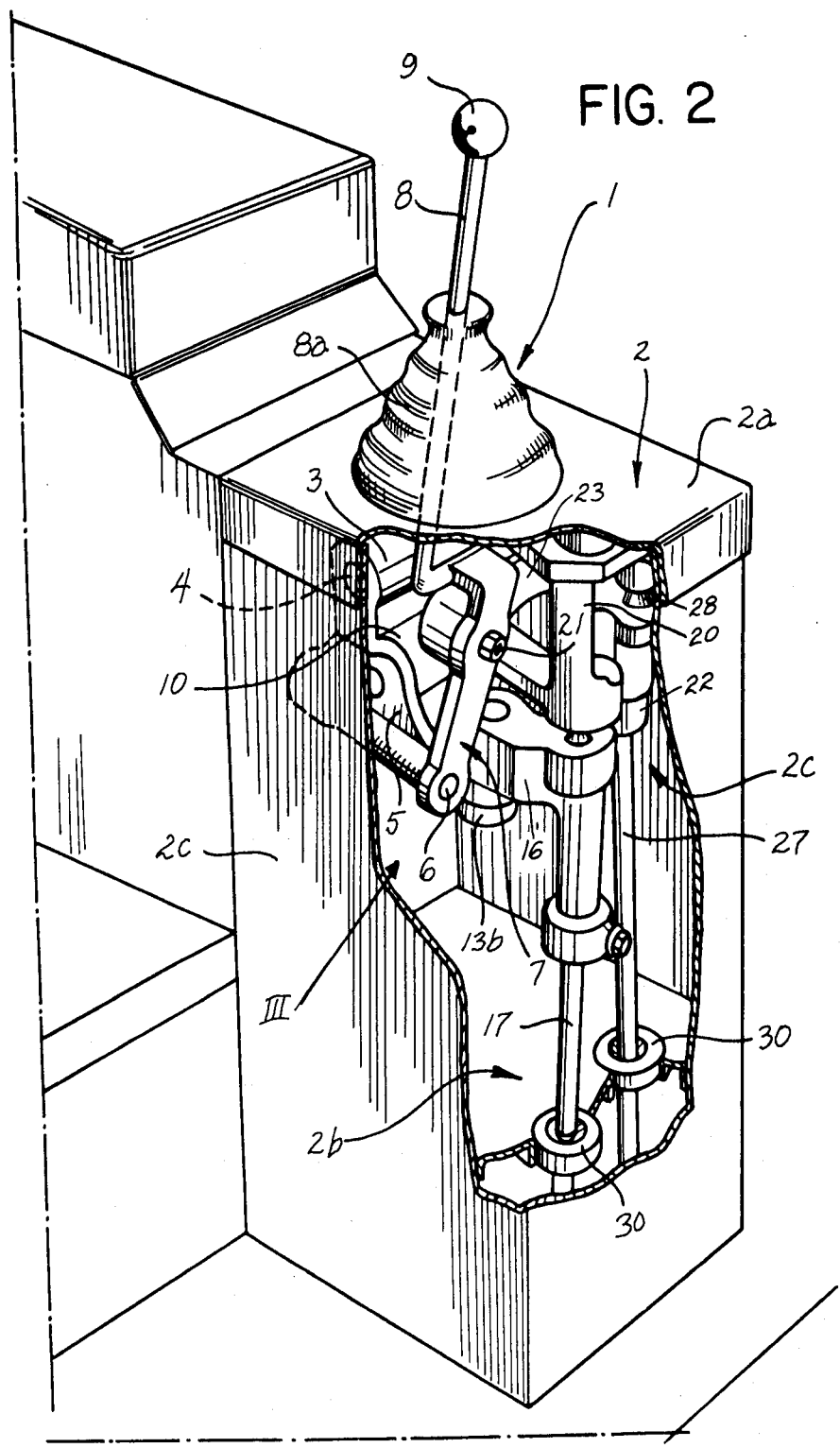
FIG. 2 is a partial cut-away view, on an enlarged scale, of one detail of FIG. 1, showing the control lever mechanism of the invention.

Rotatable output shafts 17 and 27 extend downward and pass through openings in the lower wall 2b of housing 2 as best shown in FIG. 2. As illustrated in FIGS. 2 and 4, output shafts 17 and 27 pass through respective rings 30 positioned at the openings in lower wall 2b by which the rods may rotate relative to housing 2 and by which a seal is created preventing the introduction in the housing of foreign material such as dirt, dust, and the like.

In operation of the control mechanism of the invention, it should be apparent that control lever 7, by manipulation of lever arm 8, is capable of undergoing movement in a longitudinal or lateral plane relative to the vehicle, in which lever 7 either pivots laterally about the axis formed by pivot shaft 6 or longitudinally pivots about the axis formed by pivot shaft 4, as best shown in FIGS. 3 and 4. By moving lever 7 laterally about axis 6, rotation of shaft 27 is effected through intermediate rod 23 and radial arm 22 to the exclusion of rotation of shaft 17. On the other hand, if the lever 8 is moved in a longitudinal plane about shaft 4, rotation of shaft 17 occurs to the exclusion of movement of shaft 27 as a result of the action of lever 5, intermediate rod 13, and radial arm 16. It should be also apparent that control lever 7 may be moved in planes other than lateral or longitudinal, in a plane by which selective control of both shafts 17 and 27 is effected. The foregoing movements are attained in accordance with the invention with minimum friction and hence minimum physical effort in manipulating lever arm 8, because of the existence of the plurality of spherical joints in the linkage as previously described. Such selective rotation of output shafts 17 and 27 effects operation of the valves of a hydraulic distributor by coupling the movement of the output shafts to two or more of the valves of the hydraulic device by any conventional coupling technique (not shown).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the bast mode contemplated for carrying out this invention, but that the invention will include all embodiments falling within the scope of the appended claims.

What is claimed is:

1. A control lever mechanism for controlling the operation of a hydraulic device comprising
   housing means providing a sealed enclosure,
   said housing means enclosing a linkage means positioned therein,
   a control lever extending exteriorly of said housing means and pivotally coupled to said linkage means for pivotal movement in a plurality of planes,
   a pair of output shafts operatively coupled to the linkage means for rotatable movement for controlling the operation of a hydraulic device in response to the pivotal movement of said control lever,
   said linkage means including spherical joint means,
   said pair of output shafts are respectively further coupled to said housing means,
   said pair of output shafts extending downward from within said housing means to a position beneath said housing means, and
   said pair of output shafts being respectively coupled to said housing means by spherical joint means.

2. The control lever mechanism of claim 1 wherein said spherical joint means includes a plurality of spherical socket members opening in a downward direction within said housing to reduce the accumulation of foreign substances therein.

3. The control lever mechanism of claim 1 wherein said housing means includes a pair of downward projecting boss members, said spherical joint means of said output shafts, including a downward opening socket formed in each of said boss members.

4. The control lever mechanism of claim 1 wherein said linkage means includes a pair of radial arms rigidly coupled to a respective output shaft.

5. The control lever mechanism of claim 4 wherein said linkage means further includes a pair of connecting rods having an end pivotally coupled to a respective radial arm.

6. The control lever mechanism of claim 5 wherein said connecting rods are coupled to said radial arms by spherical joint means.

7. A control lever mechanism for controlling the operation of a hydraulic device comprising
   housing means providing a sealed enclosure,
   said housing means enclosing a linkage means positioned therein,
   a control lever extending exteriorly of said housing means and pivotally coupled to said linkage means for pivotal movement in a plurality of planes,
   a pair of output shafts operatively coupled to the linkage means for rotatable movement for controlling the operation of a hydraulic device in response to the pivotal movement of said control lever,
   said linkage means including spherical joint means,
   said pair of output shafts being further coupled respectively to said housing means,
   said linkage means including a pair of radial arms rigidly coupled to a respective output shaft,
   said linkage means further including a pair of connecting rods having an end pivotally coupled to a respective radial arm,
   said connecting rods being coupled to said radial arm by spherical joint means, and
   said linkage means further including coupling means for mounting the respective opposite ends of said connecting rods for pivotal movement about perpendicular axes.

8. The control lever mechanism of claim 7 wherein said housing means is sealed against introduction of foreign particles therein.

9. The control lever mechanism of claim 7 wherein said lever further includes means to support an end of said control lever about the other of said perpendicular axes.

10. The control lever mechanism of claim 7 wherein said coupling means includes a spherical joint means.

11. The control lever mechanism of claim 10 wherein said control lever is operatively coupled to said linkage means for pivotal movement about a pair of perpendicular axes.

12. The control lever mechanism of claim 11 wherein said linkage means further includes a lever operatively connected to said control lever, mounting means coupled to the housing means to support an end of said lever for pivotal movement about one of said perpendicular axes of movement of said control lever.

* * * * *